US011947309B2

(12) United States Patent
Sakai

(10) Patent No.: US 11,947,309 B2
(45) Date of Patent: Apr. 2, 2024

(54) IMAGE FORMING APPARATUS HAVING AN ADHESION-SUPPRESSING COMPONENT TO SUPPRESS ADHESION OF FLOATING MATTER

(71) Applicant: FUJIFILM Business Innovation Corp., Tokyo (JP)

(72) Inventor: Yusuke Sakai, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/901,954

(22) Filed: Sep. 2, 2022

(65) Prior Publication Data

US 2023/0236539 A1 Jul. 27, 2023

(30) Foreign Application Priority Data

Jan. 24, 2022 (JP) ................................. 2022-008945

(51) Int. Cl.

| | |
|---|---|
| ***G03G 21/16*** | (2006.01) |
| ***G03G 15/00*** | (2006.01) |
| ***G03G 15/01*** | (2006.01) |
| ***G03G 21/12*** | (2006.01) |
| ***G03G 21/18*** | (2006.01) |

(52) U.S. Cl.

CPC ....... *G03G 21/168* (2013.01); *G03G 15/0142* (2013.01); *G03G 15/556* (2013.01); *G03G 21/12* (2013.01); *G03G 21/1825* (2013.01); *G03G 21/1864* (2013.01); *G03G 2221/1642* (2013.01)

(58) Field of Classification Search

CPC .. G03G 21/12; G03G 21/168; G03G 21/1825; G03G 21/1864; G03G 15/0142; G03G 15/556; G03G 2221/1642

See application file for complete search history.

(56) References Cited

U.S. PATENT DOCUMENTS

2018/0011441 A1* 1/2018 Ueno .................. G03G 21/206
2021/0302903 A1* 9/2021 Ise ...................... G03G 21/105

FOREIGN PATENT DOCUMENTS

JP 2009-093099 A 4/2009

* cited by examiner

*Primary Examiner* — Joseph S Wong
(74) *Attorney, Agent, or Firm* — Sughrue Mion, PLLC

(57) ABSTRACT

An image forming apparatus includes a detachable unit attachable to and detachable from an apparatus body, a preceding unit configured to move relative to the apparatus body before the detachable unit is attached to or detached from the apparatus body, and an adhesion-suppressing component provided on the preceding unit and configured to suppress adhesion of floating matter in the apparatus body to a grip of the detachable unit by covering the grip.

6 Claims, 10 Drawing Sheets

IMAGE FORMING APPARATUS HAVING AN ADHESION-SUPPRESSING COMPONENT TO SUPPRESS ADHESION OF FLOATING MATTER

CROSS-REFERENCE TO RELATED APPLICATIONS

This application is based on and claims priority under 35 USC 119 from Japanese Patent Application No. 2022-008945 filed Jan. 24, 2022.

BACKGROUND

(i) Technical Field

The present disclosure relates to an image forming apparatus.

(ii) Related Art

Hitherto proposed techniques relating to image forming apparatuses include the one disclosed by Japanese Unexamined Patent Application Publication No. 2009-93099, for example.

Japanese Unexamined Patent Application Publication No. 2009-93099 relates to an electrophotographic image forming apparatus including a detachable unit and a collecting component. The detachable unit contains a toner and/or a carrier. The collecting component is configured to collect the detachable unit in such a manner as to enclose the detachable unit when the detachable unit is exchanged.

SUMMARY

Aspects of non-limiting embodiments of the present disclosure relate to making floating matter such as toner cloud less likely to adhere to a grip of a detachable unit than in a case where the grip of the detachable unit is exposed inside an apparatus body.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a detachable unit attachable to and detachable from an apparatus body, a preceding unit configured to move relative to the apparatus body before the detachable unit is attached to or detached from the apparatus body, and an adhesion-suppressing component provided on the preceding unit and configured to suppress adhesion of floating matter in the apparatus body to a grip of the detachable unit by covering the grip.

BRIEF DESCRIPTION OF THE DRAWINGS

An exemplary embodiment of the present disclosure will be described in detail based on the following figures, wherein.

DETAILED DESCRIPTION

Exemplary Embodiment

Figure 1:
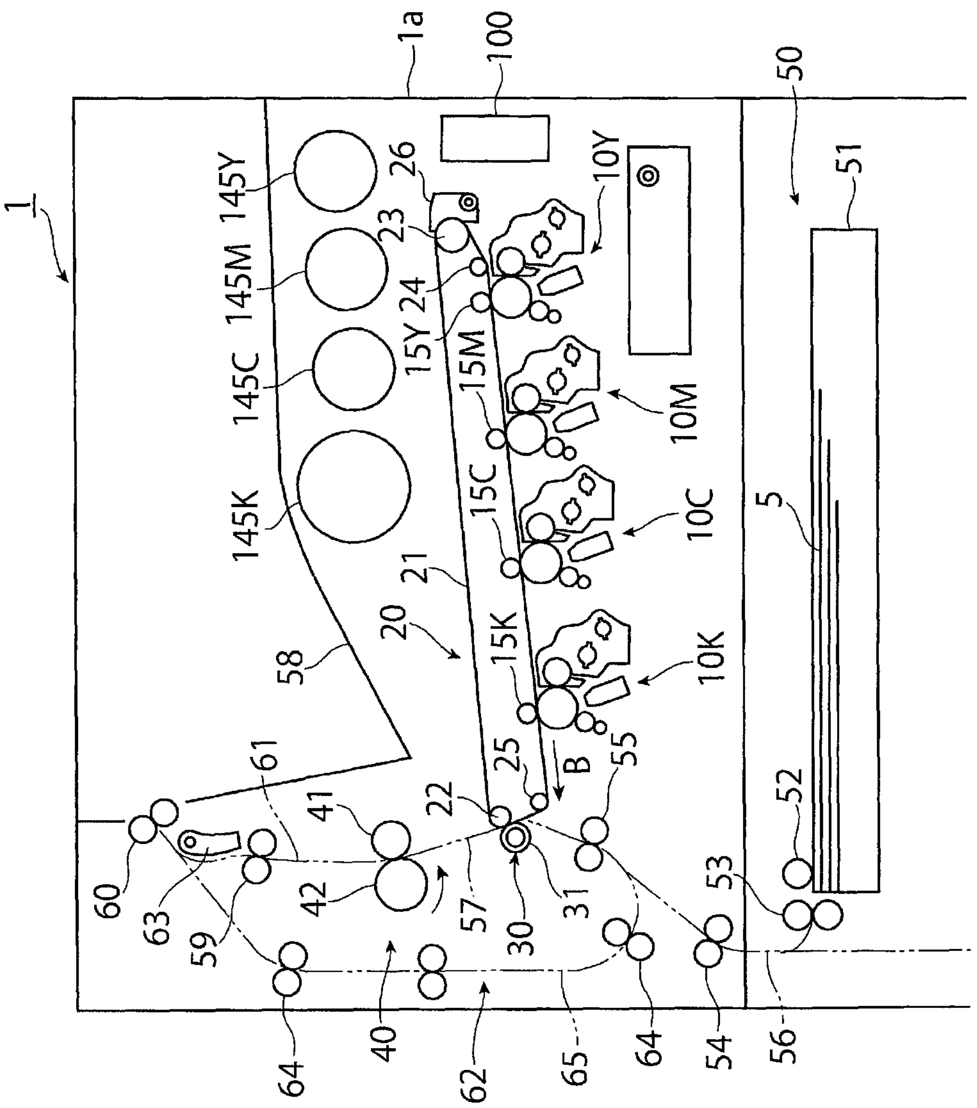
FIG. 1 illustrates an overall configuration of an image forming apparatus according to the exemplary embodiment of the present disclosure.

FIG. 1 illustrates the entirety of an image forming apparatus 1 according to an exemplary embodiment of the present disclosure.

Overall Configuration of Image Forming Apparatus

The image forming apparatus 1 according to the present exemplary embodiment is configured as, for example, a color printer. As illustrated in FIG. 1, the image forming apparatus 1 includes a plurality of imaging devices 10, an intermediate transfer device 20, a sheet-feeding device 50, a fixing device 40, and so forth. The imaging devices 10 are configured to form toner images developed with toners contained in developers. The intermediate transfer device 20 is configured to receive the toner images formed by the imaging devices 10 and to transport the toner images to a second-transfer position, where the toner images are eventually transferred to a recording sheet 5 in a second-transfer process. The recording sheet 5 is an exemplary recording medium. The sheet-feeding device 50 stores predetermined recording sheets 5 to be supplied to the second-transfer position defined in the intermediate transfer device 20, and is configured to feed each of the recording sheets 5. The fixing device 40 is configured to fix the toner images on the recording sheet 5 obtained in the second-transfer process performed by the intermediate transfer device 20. The image forming apparatus 1 has an apparatus body 1*a*. The apparatus body 1*a* includes supporting members, exterior coverings, and so forth. The two-dot chain lines in FIG. 1 represent transport paths along which the recording sheet 5 is transported in the apparatus body 1*a*.

The imaging devices 10 are four imaging devices 10Y, 10M, 10C, and 10K, which are configured to exclusively form respective toner images in four respective colors of yellow (Y), magenta (M), cyan (C), and black (K). The four imaging devices 10 (Y, M, C, and K) are arranged in an inclined line in the apparatus body 1*a*, with the imaging device 10Y for yellow (Y) being at the highest position and the imaging device 10K for black (K) being at the lowest position.

The four imaging devices 10 are categorized into color imaging devices 10 (Y, M, and C) for yellow (Y), magenta (M), and cyan (C); and a black (K) imaging device 10K. The black imaging device 10K is provided at the downstream-most position in a direction B, in which an intermediate transfer belt 21 rotates. The intermediate transfer belt 21 is included in the intermediate transfer device 20. The image forming apparatus 1 has the following imaging modes: a full-color mode in which the color imaging devices 10 (Y, M, and C) and the black (K) imaging device 10K are all activated to form a full-color image as a whole, and a monochrome mode in which only the black (K) imaging device 10K is activated to form a monochrome image.

Figure 2:
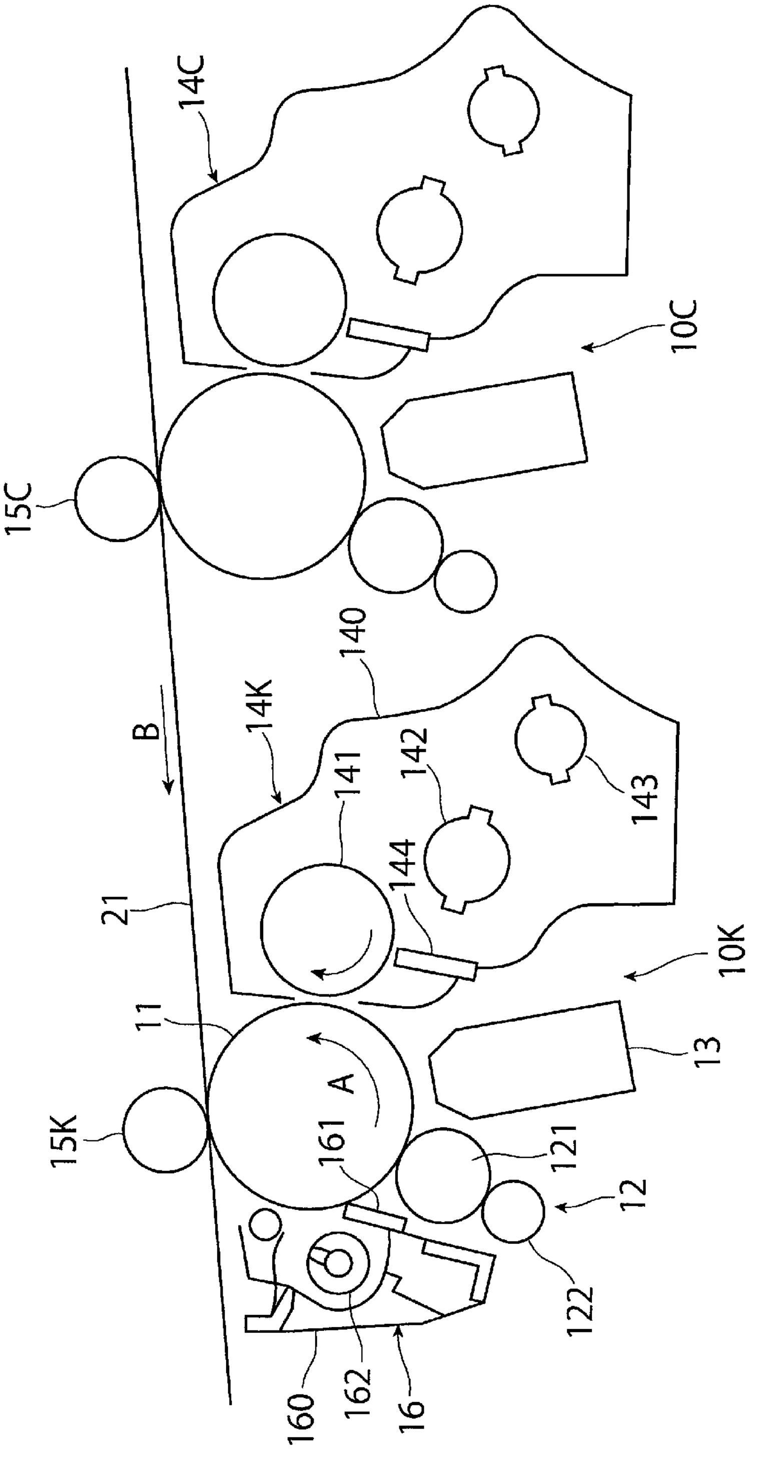
FIG. 2 illustrates imaging devices included in the image forming apparatus according to the exemplary embodiment of the present disclosure.

Referring to FIG. 2, the imaging devices 10 (Y, M, C, and K) each include a rotatable photoconductor drum 11, which is an exemplary image forming component (image carrier). Around the photoconductor drum 11 are provided a charging device 12, an exposure device 13, a developing device 14 (Y, M, C, or K), a first-transfer device 15 (Y, M, C, or K), a drum-cleaning device 16 (Y, M, C, or K), and other relevant devices. The charging device 12 is configured to charge the peripheral surface (an image-carrying surface) of the photoconductor drum 11, on which an image is to be formed, to a predetermined potential. The exposure device 13 is configured to apply light generated from image information (a signal) to the charged peripheral surface of the photoconductor drum 11 and thus produce a potential difference, which forms an electrostatic latent image (for a corresponding one of the colors). The developing device 14 (Y, M, C, or K) is an exemplary image forming component (developing component) and is configured to develop the electrostatic latent image into a toner image with the toner contained in the developer for a corresponding one of the colors (Y, M, C, and K). The first-transfer device 15 (Y, M, C, or K) is configured to transfer the toner image to the intermediate transfer device 20 in a first-transfer process. The drum-cleaning device 16 (Y, M, C, or K) is configured to remove residual matter, such as toner particles, from the image-carrying surface of the photoconductor drum 11 having undergone the first-transfer process.

The photoconductor drum 11 is obtained by providing a photoconductive layer (photosensitive layer) made of a photosensitive material over the peripheral surface of a circular cylindrical or columnar base member that is to be grounded. The photoconductive layer forms the image-carrying surface. The photoconductor drum 11 is supported in such a manner as to be rotatable in a direction A when receiving a driving force from a driving device (not illustrated).

The charging device 12 includes a contact charging roller 121, which is positioned in contact with the photoconductor drum 11. The charging roller 121 is provided with a cleaning roller 122, which is positioned to be in contact with the back of the charging roller 121 so as to clean the surface of the charging roller 121. The charging device 12 is supplied with a charging voltage. If the developing device 14 employs a reversal development scheme, the charging voltage is a voltage or current of a polarity that is the same as the polarity to which the toner to be supplied from the developing device 14 is charged. The charging roller 121 and the cleaning roller 122 rotate by receiving the driving force through the photoconductor drum 11.

The exposure device 13 is a printhead including a plurality of light-emitting-diodes (LEDs), as light-emitting devices, arrayed in the axial direction of the photoconductor drum 11. The exposure device 13 is configured to form an electrostatic latent image by applying light generated from the image information to the photoconductor drum 11. The exposure device 13 may be a device configured to perform polarization scanning in the axial direction of the photoconductor drum 11 with a laser beam generated from the image information.

The developing device 14 (Y, M, C, or K) has a housing 140, which has an opening and chambers for storing the developer. The housing 140 houses a developing roller 141, a stirring-and-supplying member 142, a stirring-and-transporting member 143, a layer-thickness-regulating member 144, and so forth. The developing roller 141 is configured to carry the developer to a developing area that faces the photoconductor drum 11. The stirring-and-supplying member 142 is a screw auger or the like and is configured to cause the developer to move over the developing roller 141 while stirring the developer. The stirring-and-transporting member 143 is a screw auger or the like and is configured to transport the developer to the stirring-and-supplying member 142 while stirring the developer. The layer-thickness-regulating member 144 is configured to regulate the amount (thickness) of the developer to be carried by the developing roller 141. The developing device 14 is supplied with a developing voltage from a power source device (not illustrated). The developing voltage is placed between the developing roller 141 and the photoconductor drum 11. The developing roller 141 is configured to rotate in a predetermined direction when receiving a driving force from a driving device (not illustrated). The stirring-and-supplying member 142 and the stirring-and-transporting member 143 rotate by receiving the driving force through the developing roller 141. The developer for each of the four colors is a two-component developer containing a nonmagnetic toner and a magnetic carrier The first-transfer device 15 (Y, M, C, or K) is a contact transfer device including a first-transfer roller that is configured to rotate by being in contact with the periphery of the photoconductor drum 11 with the intermediate transfer belt 21 in between. The first-transfer roller is supplied with a first-transfer voltage. The first-transfer voltage is a direct-current voltage supplied from a power source device (not illustrated) and having a polarity opposite to the polarity to which the toner is charged.

The drum-cleaning device 16 includes a container-like body 160, a cleaning plate 161, a delivering member 162, and so forth. A part of the body 160 is open. The cleaning plate 161 is pressed with a predetermined pressure against the peripheral surface of the photoconductor drum 11 having undergone the first-transfer process, thereby removing residual matter such as toner particles. The delivering member 162 is a screw auger or the like and is configured to collect the matter such as the toner particles removed by the cleaning plate 161 and to deliver the collected matter to a collecting system (not illustrated). The cleaning plate 161 is a plate-like member (such as a blade) made of rubber or the like. The delivering member 162 of the drum-cleaning device 16 rotates by receiving the driving force through the photoconductor drum 11.

Referring to FIG. 1, the intermediate transfer device 20 is located above the imaging devices 10 (Y, M, C, and K). As illustrated in FIG. 1, the intermediate transfer device 20 includes the intermediate transfer belt 21, a plurality of belt-supporting rollers 22 to 25, a second-transfer device 30, and a belt-cleaning device 26. The intermediate transfer belt 21 is configured to rotate in the direction B in such a manner as to pass through the first-transfer positions defined between the photoconductor drums 11 and the respective first-transfer devices 15 (first-transfer rollers). The belt-supporting rollers 22 to 25 support the intermediate transfer belt 21 from the inner side such that the intermediate transfer belt 21 is retained in a predetermined position while being allowed to rotate. The second-transfer device 30 is an exemplary second-transfer component and is positioned in contact with the outer peripheral surface (an image-carrying surface) of the intermediate transfer belt 21 at a position across from the belt-supporting roller 22. The second-transfer device 30 is configured to transfer the toner images from the intermediate transfer belt 21 to a recording sheet 5 in the second-transfer process. The belt-cleaning device 26 is configured to remove residual matter, such as toner particles and paper lint, from the outer peripheral surface of the intermediate transfer belt 21 at a position past the second-transfer device 30.

The intermediate transfer belt 21 is an endless belt made of, for example, synthetic resin such as polyimide resin or polyamide resin in which a resistance regulator or the like such as carbon black is dispersed. The belt-supporting roller 23 serves as a counter roller for the belt-cleaning device 26 and also serves as a driving roller that is rotated by a driving device (not illustrated). The belt-supporting roller 24 serves as a surface-defining roller that defines the image forming surface of the intermediate transfer belt 21. The belt-supporting roller 25 serves as a tension-applying roller that applies a tension to the intermediate transfer belt 21. The belt-supporting roller 22 serves as a counter roller located across from the second-transfer device 30.

The belt-supporting roller 24 of the intermediate transfer device 20 is movable together with the first-transfer devices 15 (Y, M, C, and K) inward and outward relative to the intermediate transfer belt 21. In the full-color mode, as illustrated in FIG. 1, the belt-supporting roller 24 is positioned such that the first-transfer devices 15 (Y, M, C, and K) are in contact with the surfaces of the respective photoconductor drums 11 (Y, M, C, and K) with the intermediate transfer belt 21 in between. In the monochrome mode, the belt-supporting roller 24 is positioned such that only the black (K) first-transfer device 15K is in contact with the surface of the black (K) photoconductor drum 11K with the intermediate transfer belt 21 in between while the color first-transfer devices 15 (Y, M, and C) and the intermediate transfer belt 21 are spaced apart from the surfaces of the photoconductor drums 11 (Y, M, and C).

During the maintenance work, the belt-supporting roller 24 is positioned such that the color first-transfer devices 15 (Y, M, and C), the black (K) first-transfer device 15K, and the intermediate transfer belt 21 are spaced apart from the surfaces of the photoconductor drums 11 (Y, M, C, and K).

As illustrated in FIG. 1, the second-transfer device 30 is a contact transfer device including a second-transfer roller 31. The second-transfer roller 31 is configured to rotate by being in contact with the outer peripheral surface of the intermediate transfer belt 21 at the second-transfer position, which is defined in the intermediate transfer device 20 on the outer peripheral surface of the intermediate transfer belt 21 and where the intermediate transfer belt 21 is supported by the belt-supporting roller 22. The second-transfer roller 31 is supplied with a second-transfer voltage. The second-transfer voltage is supplied from a power source device (not illustrated) to the second-transfer roller 31 or to the belt-supporting roller 22 of the intermediate transfer device 20 and is a direct-current voltage having a polarity opposite to or the same as the polarity to which the toners are charged.

The fixing device 40 has a housing (not illustrated) having an introduction port and a discharge port for the recording sheet 5 and that houses a heating rotary member 41, a pressing rotary member 42, and so forth. The heating rotary member 41 is in the form of a roller or a belt and is configured to rotate in the direction of the arrow and to be heated by a heating component such that the surface thereof is kept at a predetermined temperature. The pressing rotary member 42 is in the form of a belt or a roller and is configured to rotate by being in contact with the heating rotary member 41 with a predetermined pressure over an area extending substantially in the axial direction of the heating rotary member 41. In the fixing device 40, the contact area where the heating rotary member 41 and the pressing rotary member 42 are in contact with each other serves as a fixing part, where a predetermined fixing process (heating and pressing) is to be performed.

The sheet-feeding device 50 is located below the imaging devices 10 (Y, M, C, and K). The sheet-feeding device 50 includes a single sheet storage 51 (or a plurality of sheet storages 51) and delivering devices 52 and 53. The sheet storage 51 stores a stack of recording sheets 5 that are of one predetermined size, kind, or the like. The delivering devices 52 and 53 are configured to deliver the recording sheets 5 one by one from the sheet storage 51. The sheet storage 51 is drawable from, for example, the front face of the apparatus body 1*a* (the face toward which the user who is operating the apparatus 1 faces).

Examples of the recording sheet 5 include thin papers, such as plain paper and tracing paper, intended for electrophotographic machines such as copiers and printers; and sheets intended for over-head projectors (OHPs). The surface smoothness of the fixed image may be improved by using a recording sheet 5 having a highly smooth surface. Examples of such a recording sheet 5 include coated paper obtained by coating plain paper with resin or the like; and thick paper, such as art paper intended for printing, having a relatively heavy basis weight.

A sheet-feeding path 56 extends between the sheet-feeding device 50 and the second-transfer device 30. The sheet-feeding path 56 is provided with a single pair or a plurality of pairs of sheet-transporting rollers 54 and 55 and transporting guides (not illustrated), with which the recording sheet 5 fed from the sheet-feeding device 50 is transported to the second-transfer position. The pair of sheet-transporting rollers 55 located immediately before the second-transfer position in the sheet-feeding path 56 serves as, for example, a pair of rollers (registration rollers) that adjusts the timing of transporting the recording sheet 5. A sheet transport path 57 extends between the second-transfer device 30 and the fixing device 40. The recording sheet 5 having undergone the second-transfer process and exited from the second-transfer device 30 is transported along the sheet transport path 57 to the fixing device 40. A sheet output path 61 extends near a sheet output port, which is provided in the apparatus body 1*a* of the image forming apparatus 1. The sheet output path 61 is provided with pairs of sheet output rollers 59 and 60. The recording sheet 5 having undergone the fixing process and exited from the fixing device 40 is outputted along the sheet output path 61 to a sheet output portion 58, which is provided at the top of the apparatus body 1*a*.

The image forming apparatus 1 further includes a duplex unit 62, which is used when images are formed on the two respective sides of the recording sheet 5. Before the recording sheet 5 having an image formed on one side thereof and being transported by the pair of sheet output rollers 59 is outputted to the sheet output portion 58, the pair of sheet output rollers 60 is rotated backward with the trailing end of the recording sheet 5 being held by the pair of sheet output rollers 60. Then, the recording sheet 5 is introduced into the duplex unit 62 by a switching gate 63. The duplex unit 62 includes a duplex transport path 65, which is provided with a plurality of transport rollers 64 and transport guides (not illustrated). In the duplex transport path 65, the recording sheet 5 is transported by the transport rollers 64 and the transport guides, whereby the front and back sides of the recording sheet 5 are reversed.

Toner cartridges 145 (Y, M, C, and K), illustrated in FIG. 1, are exemplary developer containers that each store the developer containing at least the toner to be supplied to a corresponding one of the developing devices 14. In the present exemplary embodiment, the toner cartridges 145 (Y, M, C, and K) each store only the toner.

The operation of the image forming apparatus 1 is generally controlled by a control device 100, illustrated in FIG. 1. The control device 100 includes a central processing unit (CPU), a read-only memory (ROM), a random access memory (RAM), buses connecting the foregoing to one another, and a communication interface, all of which are not illustrated.

Operation of Image Forming Apparatus

A basic image forming operation performed by the image forming apparatus 1 will now be described.

The following description relates to an operation in the full-color mode in which a full-color image composed of toner images having the four respective colors (Y, M, C, and K) is formed by using the four imaging devices 10 (Y, M, C, and K).

When the image forming apparatus 1 receives image information and a command that requests an operation (printing operation) of forming a full-color image from a device such as a personal computer or an image-reading device that is not illustrated, the control device 100 activates the four imaging devices 10 (Y, M, C, and K), the intermediate transfer device 20, the second-transfer device 30, the fixing device 40, and other relevant devices.

In the imaging devices 10 (Y, M, C, and K), referring to FIGS. 1 and 2, the photoconductor drums 11 first rotate in the direction A, and the charging devices 12 charge the surfaces of the photoconductor drums 11 to a predetermined potential of a predetermined polarity (negative polarity, in the present exemplary embodiment). Subsequently, the exposure devices 13 generate light beams from image signals obtained through the conversion of the image information into pieces of information on the respective color components (Y, M, C, and K) and apply the light beams to the charged surfaces of the photoconductor drums 11. Thus, electrostatic latent images for the respective color components are formed as a predetermined potential difference produced on the surfaces of the photoconductor drums 11.

Subsequently, in the imaging devices 10 (Y, M, C, and K), the toners having the respective colors (Y, M, C, and K) and charged to the predetermined polarity (negative polarity) are supplied for development from the developing rollers 141 to the electrostatic latent images for the respective color components on the photoconductor drums 11 and are electrostatically attracted thereto. Thus, the electrostatic latent images for the respective color components on the photoconductor drums 11 are visualized with the toners having the respective colors into toner images in the four respective colors (Y, M, C, and K).

The toner images in the respective colors on the photoconductor drums 11 of the imaging devices 10 (Y, M, C, and K) are then transported to the respective first-transfer positions, where the first-transfer devices 15 (Y, M, C, and K) perform the first-transfer process in which the toner images in the respective colors are sequentially superposed one on top of another on the intermediate transfer belt 21 that is rotating in the direction B in the intermediate transfer device 20.

In the imaging devices 10 (Y, M, C, and K) having completed the first-transfer process, the drum cleaning devices 16 clean the surfaces of the photoconductor drums 11 by scraping residual matter from the photoconductor drums 11. Thus, the imaging devices 10 (Y, M, C, and K) are ready for the next imaging operation.

Subsequently, in the intermediate transfer device 20, the intermediate transfer belt 21 carrying the set of toner images transferred thereto in the first-transfer process rotates to transport the set of toner images to the second-transfer position. Meanwhile, in the sheet-feeding device 50, a predetermined recording sheet 5 is fed into the sheet-feeding path 56 synchronously with the imaging operation. In the sheet-feeding path 56, the pair of sheet-transporting rollers 55 serving as the pair of registration rollers supplies the recording sheet 5 to the second-transfer position synchronously with the timing of transfer.

At the second-transfer position, the second-transfer device 30 performs the second-transfer process in which the set of toner images is transferred from the intermediate transfer belt 21 to the recording sheet 5. In the intermediate transfer device 20 having completed the second-transfer process, the belt-cleaning device 26 removes residual matter, such as toner particles, from the surface of the intermediate transfer belt 21 having undergone the second-transfer process.

The recording sheet 5 now having the set of toner images received in the second-transfer process is released from the intermediate transfer belt 21 and is then transported along the sheet transport path 57 to the fixing device 40. In the fixing device 40, the recording sheet 5 having undergone the second-transfer process is made to pass through the contact area defined between the heating rotary member 41 and the pressing rotary member 42 that are rotating. Thus, the predetermined fixing process (heating and pressing) is performed on the set of unfixed toner images, whereby the set of toner images are fixed to the recording sheet 5. Lastly, the recording sheet 5 having undergone the fixing process is outputted by the pair of sheet output rollers 60 to the sheet output portion 58 provided at, for example, the top of the apparatus body 1*a*.

Through the above series of processes, a recording sheet 5 having a full-color image formed as a combination of toner images in the four respective colors is obtained.

On the other hand, when the image forming apparatus 1 receives image information and a command that requests an operation (printing operation) of forming a monochrome image from a device such as a personal computer or an image-reading device that is not illustrated, the control device 100 activates only the black (K) imaging device 10K out of the four imaging devices 10 (Y, M, C, and K), and also activates the intermediate transfer device 20, the second-transfer device 30, the fixing device 40, and other relevant devices.

In the monochrome mode, the belt-supporting roller 24 is positioned such that only the black (K) first-transfer device 15K is in contact with the surface of the black (K) photoconductor drum 11K with the intermediate transfer belt 21 in between while the color first-transfer devices 15 (Y, M, and C) and the intermediate transfer belt 21 are spaced apart from the surfaces of the photoconductor drums 11 (Y, M, and C).

Then, a black (K) toner image is formed by the black (K) imaging device 10K and is transferred to a recording sheet 5, whereby a monochrome image is obtained on the recording sheet 5.

Relevant Features of Image Forming Apparatus

Figure 3:
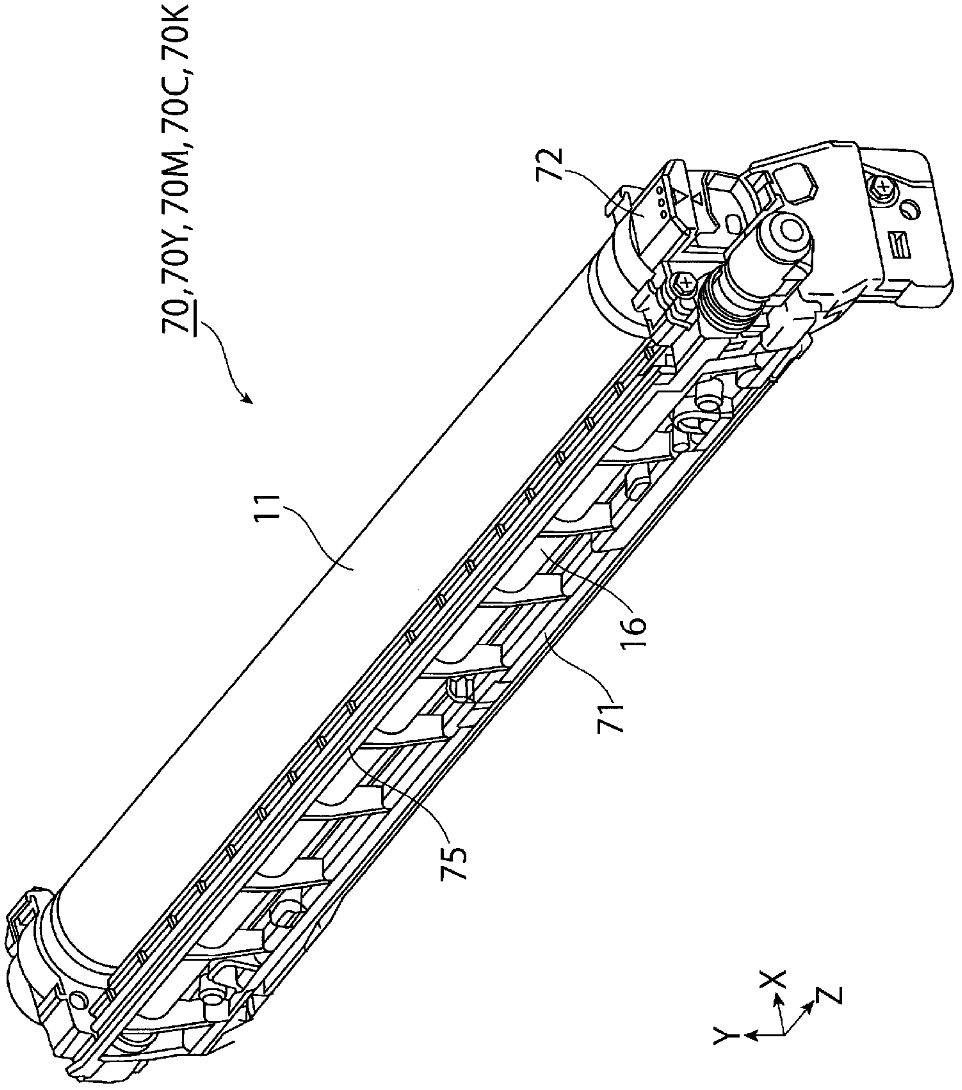
FIG. 3 is a perspective view of a photoconductor unit.

Referring to FIGS. 2 and 3, in the image forming apparatus 1 according to the present exemplary embodiment, the photoconductor drum 11 in each of the imaging devices 10 for the colors of yellow (Y), magenta (M), cyan (C), and black (K) is integrated with the charging device 12 and the drum-cleaning device 16 provided therearound into a photoconductor unit 70, which is an exemplary detachable unit. The photoconductor unit 70 is included in each of the imaging devices 10 for the respective colors of yellow (Y), magenta (M), cyan (C), and black (K). The photoconductor unit 70 is detachably attached to the apparatus body 1*a* of the image forming apparatus 1.

The photoconductor units 70 (Y, M, C, and K) for the respective colors of yellow (Y), magenta (M), cyan (C), and black (K) each include the photoconductor drum 11, the charging device 12, the drum-cleaning device 16, and a photoconductor-unit body 71, to which the photoconductor drum 11 is rotatably attached and the charging device 12 and the drum-cleaning device 16 are attached. The photoconductor-unit body 71 includes a grip 72, which is located at the upper end on the front side in the attaching/detaching direction of the photoconductor unit 70. The grip 72 is to be gripped by an operator such as a user or a service engineer when the photoconductor unit 70 is attached to or detached from the apparatus body 1*a* of the image forming apparatus 1.

Figure 4:
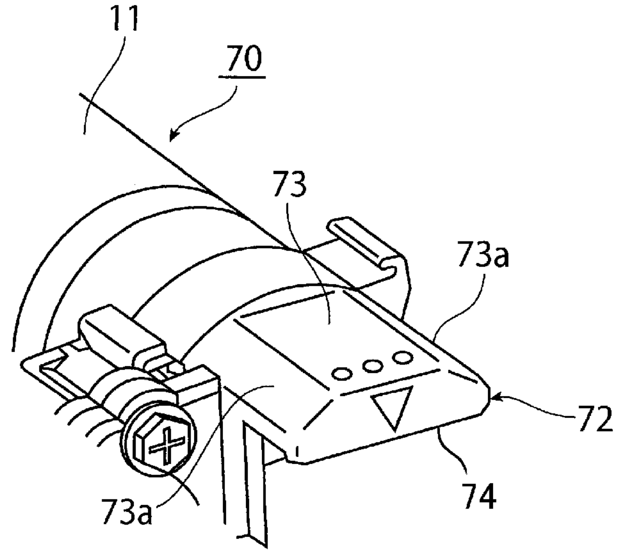
FIG. 4 is a perspective view of a relevant part of the photoconductor unit.

Referring to FIG. 4, the grip 72 of the photoconductor unit 70 has an upper end face 73 and a lower end face 74. The widthwise ends of the upper end face 73 form respective slopes 73*a*. Accordingly, the grip 72 has a substantially trapezoidal knob-like shape in front view with a grippable height (thickness). The operator such as a user or a service engineer grips the grip 72 with his/her fingers placed on the upper end face 73 and the lower end face 74. The grip 72 of the photoconductor unit 70 projects toward the front side of the apparatus body 1*a* of the image forming apparatus 1 and is exposed inside the apparatus body 1*a*.

Figure 5:
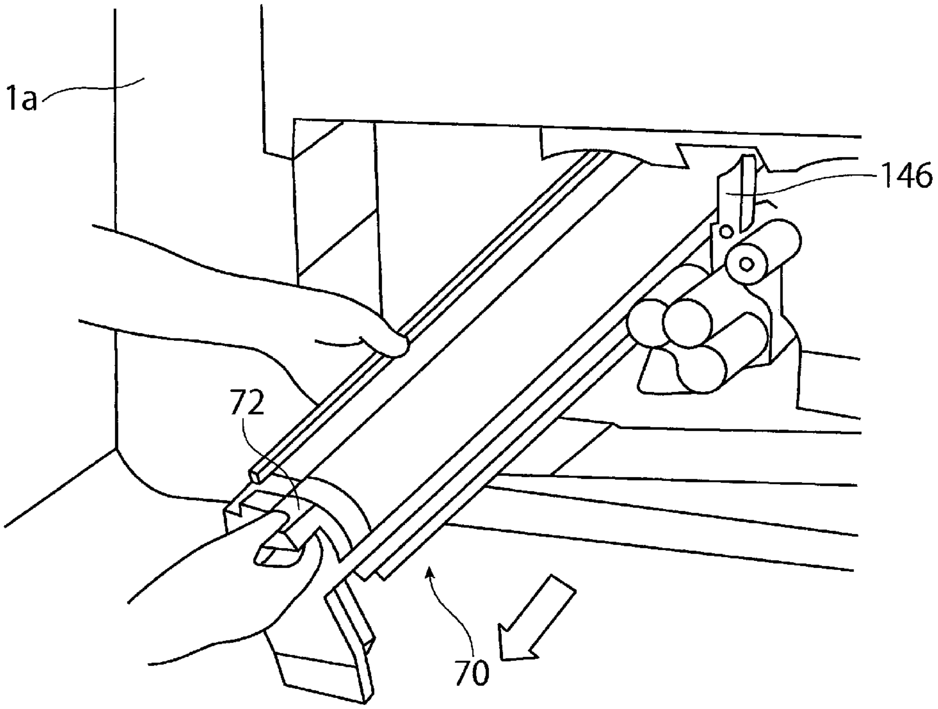
FIG. 5 illustrates how the photoconductor unit is detached from an apparatus body.

Referring to FIG. 5, to detach the photoconductor unit 70 from the apparatus body 1*a* of the image forming apparatus 1, a stopper (not illustrated) provided on the photoconductor unit 70 is disengaged from the apparatus body 1*a*, and a separating lever 146, which is provided on the developing device 14 located adjacent to the photoconductor unit 70, is rotated clockwise in FIG. 5. Thus, the photoconductor unit 70 is unfastened from the apparatus body 1*a* of the image forming apparatus 1 and is moved away from the developing roller 141 of the adjacent developing device 14.

Then, the operator such as a user or a service engineer grips the grip 72 of the photoconductor unit 70 and pulls the photoconductor unit 70 out of the apparatus body 1*a* toward the front side in the attaching/detaching direction. When the operator detaches the photoconductor unit 70 from the apparatus body 1*a*, the operator holds with his/her other hand a guide rail 75, which is provided at the upper end of the photoconductor unit 70 on one side (the left side in the example illustrated in FIGS. 3 and 5) and extends in the attaching/detaching direction.

Figure 6:
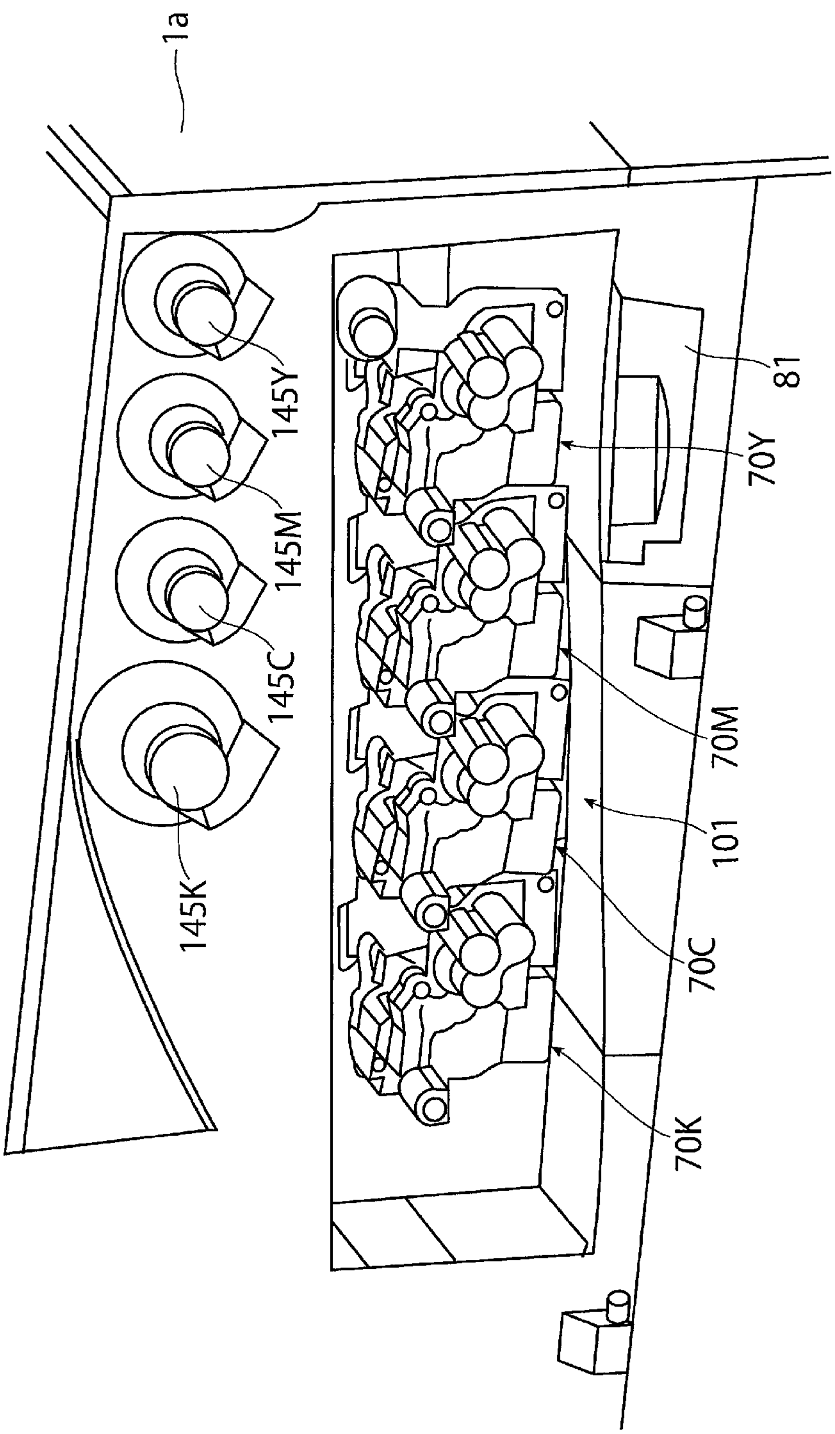
FIG. 6 is a perspective view of the image forming apparatus according to the exemplary embodiment of the present disclosure, with a front covering thereof being open.

Referring to FIG. 6, the apparatus body 1*a* of the image forming apparatus 1 has an opening 101 on the front face thereof (the face toward which the operator who is operating the apparatus 1 faces). The opening 101 of the apparatus body 1*a* appears when a front covering (not illustrated) is opened to expose the inside of the apparatus body 1*a* when, for example, the operator exchanges any of the toner cartridges 145 or any of the photoconductor units 70 (Y, M, C, and K).

Figure 7:
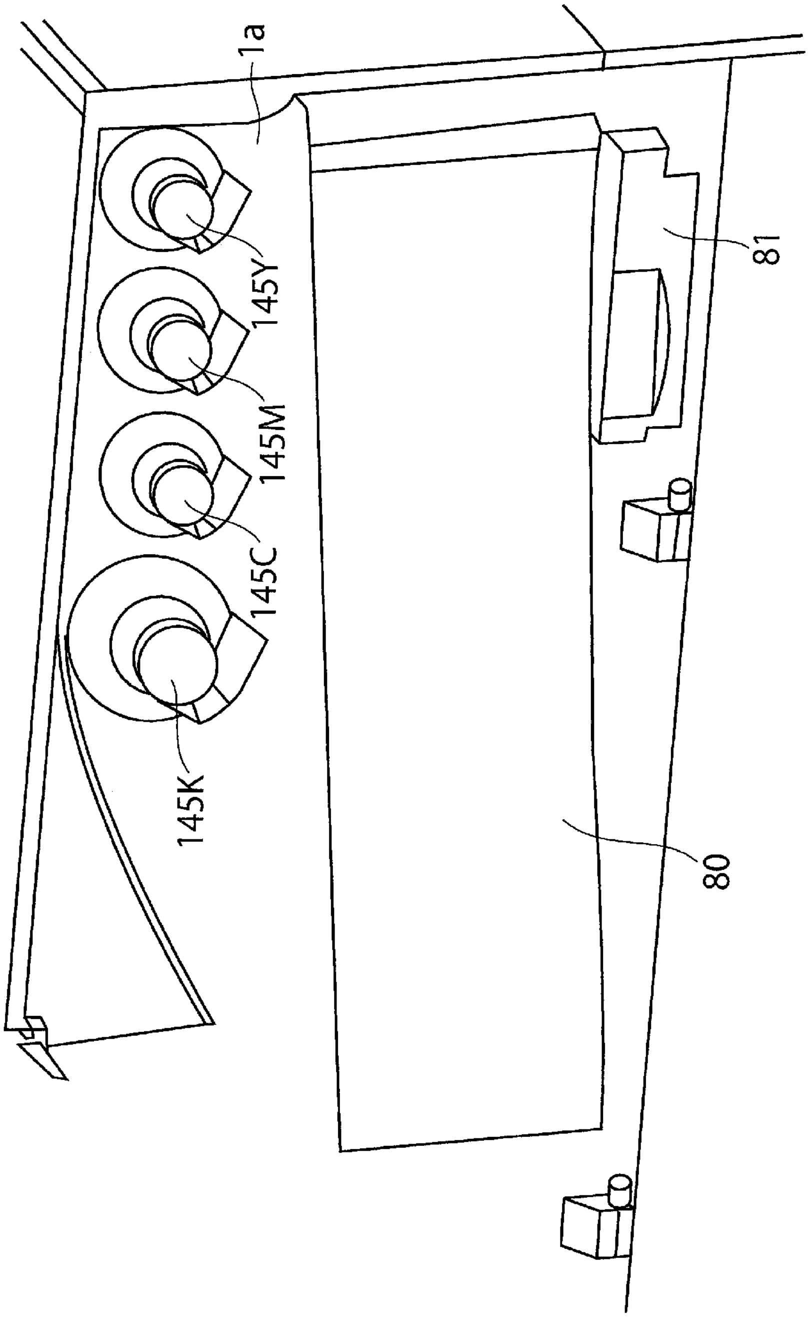
FIG. 7 is another perspective view of the image forming apparatus according to the exemplary embodiment of the present disclosure, with the front covering thereof being open.

Referring to FIG. 7, the image forming apparatus 1 includes a collecting unit 80, which is provided at the opening 101 of the apparatus body 1*a* and on the front side relative to the photoconductor units 70. The collecting unit 80 is an exemplary preceding unit that moves to a retracted position relative to the apparatus body 1*a* before any of the photoconductor unit 70 is attached to or detached from the apparatus body 1*a*. The collecting unit 80 is configured to collect and store in a collecting container 81 the following objects of collection: toner particles discharged from the photoconductor units 70 (Y, M, C, and K); developer particles discharged from the developing devices 14 (Y, M, C, and K); and toner particles, paper lint, and the like discharged from the belt cleaning devices 26. The collecting unit 80 is detachably attached to the apparatus body 1*a* of the image forming apparatus 1 at the opening 101 and on the front side relative to the photoconductor units 70.

Figure 8:
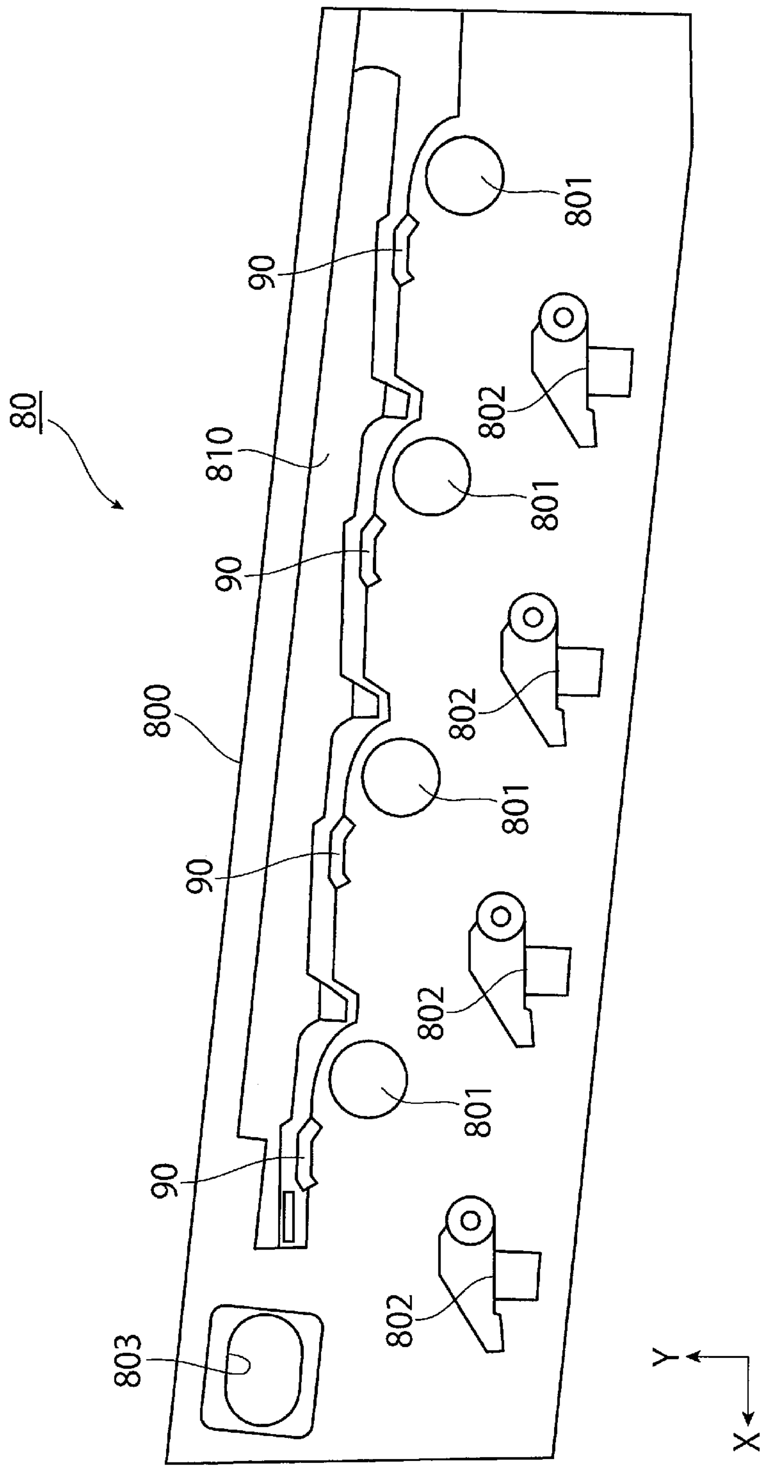
FIG. 8 is a rear view of a collecting unit.

The collecting unit 80 has an oblong, substantially rectangular box-like shape in front view, with a small depth in the depth direction of the apparatus body 1*a*. As illustrated in FIG. 8, the collecting unit 80 has a housing 800, the back face of which has first openings 801, second openings 802, a third opening 803, and so forth. With the collecting unit 80 attached to the apparatus body 1*a* of the image forming apparatus 1, the first openings 801 are separably connected to the front ends, in the attaching/detaching direction, of the drum-cleaning devices 16 of the respective photoconductor units 70, the second openings 802 are separably connected to the front ends of the respective developing devices 14, and the third opening 803 is separably connected to the front end of the belt cleaning device 26. The first openings 801, the second openings 802, and the third opening 803 are opened when the collecting unit 80 is detached from the apparatus body 1*a* and are closed when the collecting unit 80 is attached to the apparatus body 1*a*.

Referring to FIGS. 1 and 2, during the image forming operation, floating matter such as toner cloud is present inside the apparatus body 1*a* of the image forming apparatus 1 configured as above, at locations around the photoconductor drums 11, the openings of the developing devices 14, the intermediate transfer belt 21, and so forth. In particular, during an operation of successively printing high-density images such as full-color solid images, a large amount of floating matter such as toner cloud may be present inside the apparatus body 1*a* of the image forming apparatus 1. The floating matter such as toner cloud in the apparatus body 1*a* of the image forming apparatus 1 may adhere to and gradually accumulate on the upper end faces 73 of the grips 72 of the photoconductor units 70 illustrated in FIG. 4.

If such a situation occurs, the following technical problem may arise. When the operator holds the grip 72 of any of the photoconductor units 70 with his/her fingers as illustrated in FIG. 5 to pull the photoconductor unit 70 out of the apparatus body 1*a* of the image forming apparatus 1 for exchange or any other purpose, the floating matter such as toner cloud adhered to and accumulated on the upper end face 73 of the grip 72 of the photoconductor unit 70 may adhere to and contaminate the fingers of the operator.

To avoid the above situation, the image forming apparatus according to the present exemplary embodiment includes an adhesion-suppressing component. The adhesion-suppressing component is provided on the preceding unit and configured to suppress the adhesion of floating matter in the apparatus body to the grip of the detachable unit by covering the grip.

Specifically, referring to FIG. 8, the image forming apparatus 1 according to the present exemplary embodiment includes adhesion-preventing coverings 90. The adhesion-preventing coverings 90 are provided at the back face of the housing 800 of the collecting unit 80 at such positions as to meet the grips 72 of the respective photoconductor units 70. The adhesion-preventing coverings 90 are each an exemplary adhesion-suppressing component configured to suppress the adhesion of floating matter in the apparatus body 1*a* to the grip 72 of a corresponding one of the photoconductor units 70 by covering the grip 72.

As illustrated in FIG. 8, the adhesion-preventing coverings 90 provided at the back face of the collecting unit 80 are attached to the lower face of an air duct 810, through which air is sent toward the front faces of the imaging devices 10 for yellow (Y), magenta (M), cyan (C), and black (K), and at such positions as to meet the grips 72 of the respective photoconductor units 70.

Figure 9:
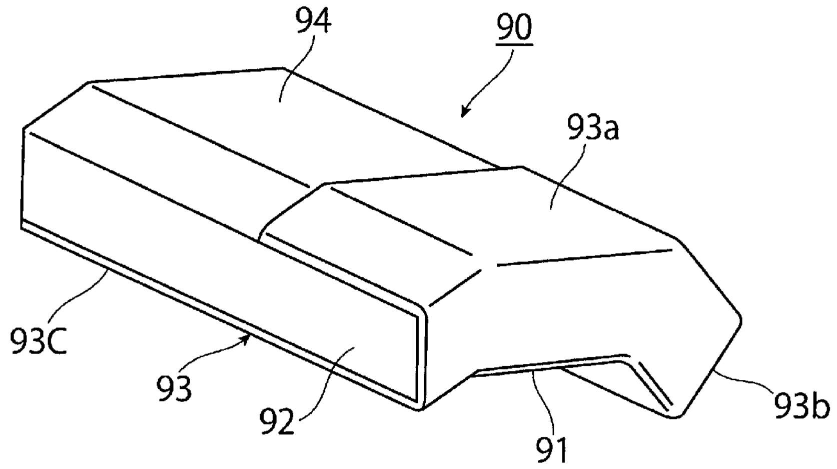
FIG. 9 is a perspective view of an adhesion-preventing covering.

Referring to FIG. 9, the adhesion-preventing coverings 90 each include a covering body 92 and a sheet-type covering member 93. The covering body 92 has a lower end face 91, which is shaped in conformity with the upper end face 73 of the grip 72 of the photoconductor unit 70. The covering body 92 has a predetermined thickness. The covering member 93 has a low sliding resistance and is provided over relevant surfaces of the covering body 92. The covering body 92 of the adhesion-preventing covering 90 is made of, for example, urethane or the like that is elastic enough to undergo elastic deformation. The covering member 93 is a sheet made of, for example, felt or the like that has a low sliding resistance and is difficult for toner particles to adhere thereto and accumulate thereon. The covering member 93 includes an upper end portion 93*a*, a distal end portion 93*b*, and a lower end portion 93*c*. The upper end portion 93*a* extends on the upper end face 94 of the covering body 92 from the distal end of the covering body 92 in the long-side direction of the covering body 92 and covers about ⅓ of the upper end face 94. The distal end portion 93*b* covers the distal end face of the covering body 92. The lower end portion 93*c* extends on the lower end face of the covering body 92 and covers the entirety of the lower end face of the covering body 92 in the long-side direction. The covering member 93 is attached to the surfaces of the covering body 92 with adhesive, double-sided adhesive tape, or the like.

Figure 10:
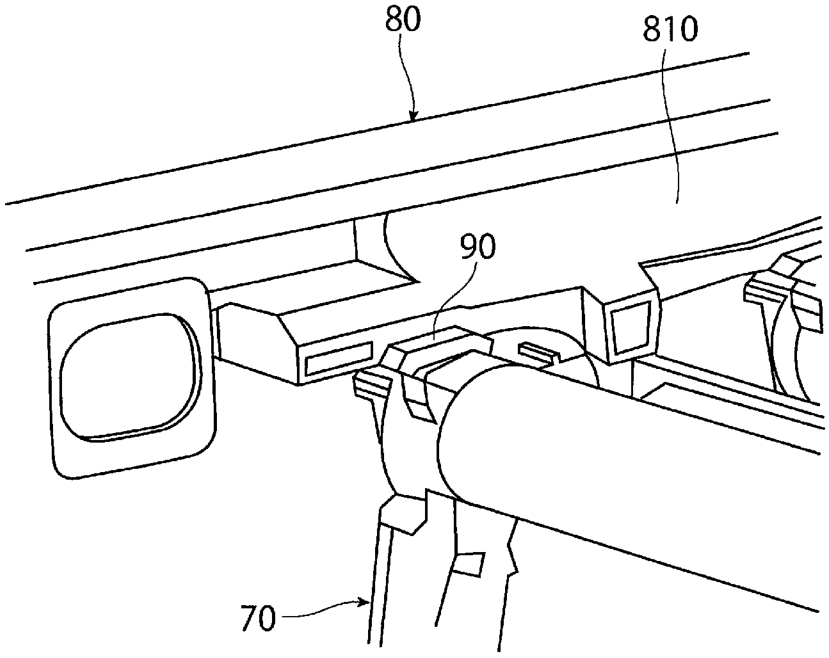
FIG. 10 is a perspective view of the adhesion-preventing covering, with the collecting unit attached to the apparatus body.

Referring to FIG. 10, the adhesion-preventing coverings 90 are fixed to the back face of the collecting unit 80 with adhesive, double-sided adhesive tape, or the like at the lower face of the air duct 810, through which air is sent toward the front faces of the imaging devices 10 for yellow (Y), magenta (M), cyan (C), and black (K), and at such positions as to meet the grips 72 of the respective photoconductor units 70.

Functions Exerted by Relevant Features of Image Forming Apparatus

In the image forming operation of the image forming apparatus 1 according to the present exemplary embodiment illustrated in FIG. 1, the imaging devices 10 (Y, M, C, and K) for the respective colors of yellow (Y), magenta (M), cyan (C), and black (K) operate such that the exposure devices 13 form electrostatic latent images by performing exposure on the photoconductor drums 11 with reference to image information, and the developing devices 14 (Y, M, C, and K) develop the electrostatic latent images on the photoconductor drums 11 into toner images by using the developing rollers 141.

Figure 11:
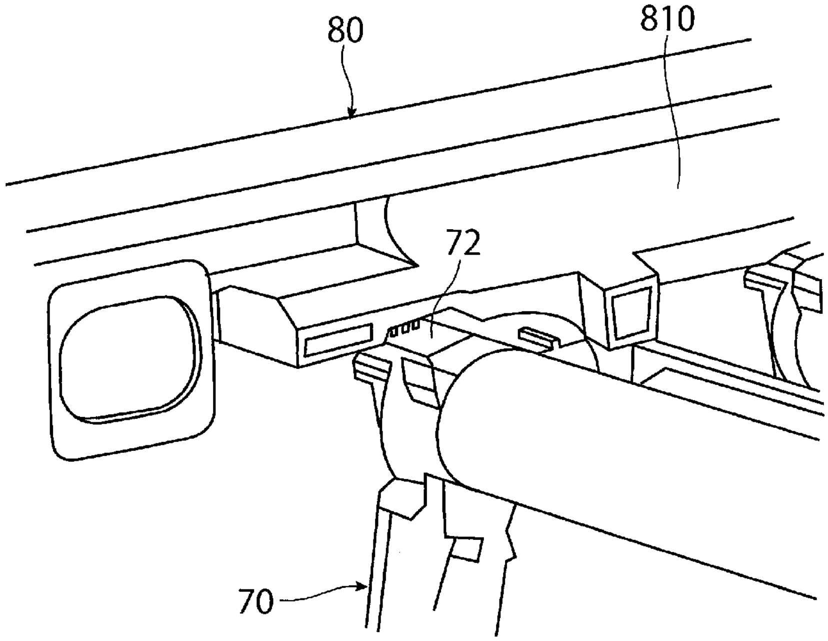
FIG. 11 RELATED ART
FIG. 11 is a perspective view of a relevant part of a related-art image forming apparatus.

During the image forming operation, floating matter such as toner cloud is present inside the apparatus body 1*a* of the image forming apparatus 1 configured as above, at locations around the photoconductor drums 11, the openings of the developing devices 14, the intermediate transfer belt 21, and so forth. In particular, during an operation of successively printing high-density images such as full-color solid images, a large amount of floating matter such as toner cloud may be present inside the apparatus body 1*a* of the image forming apparatus 1. In a related-art image forming apparatus 1 illustrated in FIG. 11, floating matter such as toner cloud in an apparatus body 1*a* adheres to and gradually accumulates on the upper end faces of grips 72 of photoconductor units 70.

In the related-art image forming apparatus 1, when the operator holds the grip 72 of any of the photoconductor units 70 with his/her fingers as illustrated in FIG. 5 to pull the photoconductor unit 70 out of the apparatus body 1*a* of the image forming apparatus 1 for exchange or any other purpose, the floating matter such as toner cloud adhered to and accumulated on the upper end face of the grip 72 of the photoconductor unit 70 adheres to and contaminates the fingers of the operator.

Figure 12:
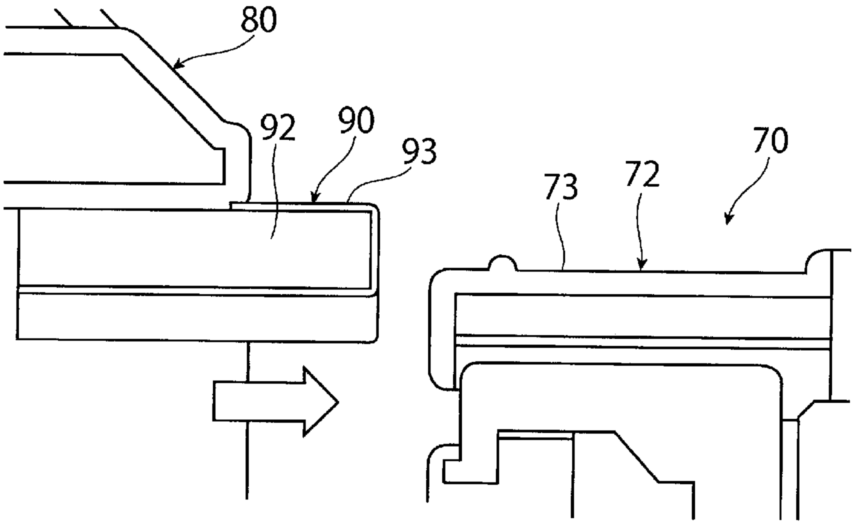
FIG. 12 illustrates how the collecting unit behaves when the photoconductor unit is attached to the apparatus body in sectional view.
Figure 13:
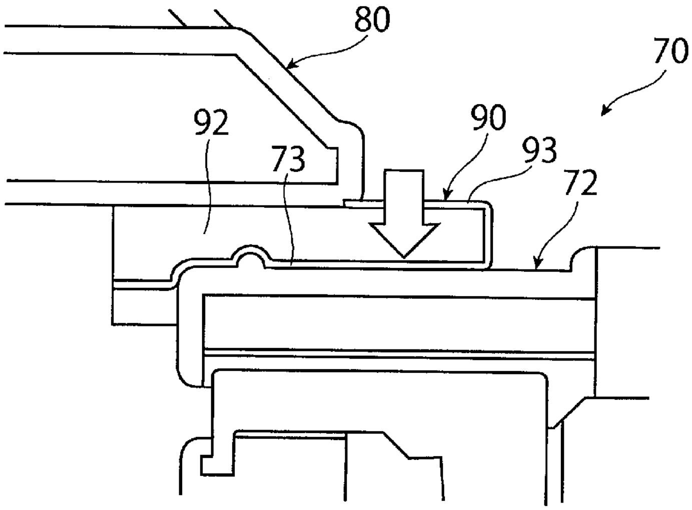
FIG. 13 illustrates how the collecting unit behaves when the photoconductor unit is attached to the apparatus body in sectional view.

In contrast, the image forming apparatus 1 according to the present exemplary embodiment includes the adhesion-preventing coverings 90 each configured to cover the upper end face 73 of the grip 72 of a corresponding one of the photoconductor units 70 as illustrated in FIG. 10. As illustrated in FIGS. 12 and 13, the adhesion-preventing covering 90 is configured not only to cover the upper end face 73 of the grip 72 of the photoconductor unit 70 but also to be in close contact with (pressed against) the upper end face 73 of the grip 72 of the photoconductor unit 70 by allowing the covering body 92 thereof to undergo elastic deformation when covering the grip 72.

Therefore, the upper end face 73 of the grip 72 of the photoconductor unit 70 is not exposed inside the apparatus body 1*a* of the image forming apparatus 1 and is covered by the adhesion-preventing covering 90 that is closely in contact therewith.

Furthermore, as illustrated in FIGS. 9 and 12, relevant surfaces of the adhesion-preventing covering 90 are covered by the covering member 93, which is an exemplary sliding member that exhibits high slidability.

While the above exemplary embodiment relates to a case where the adhesion-preventing covering 90 is added to the collecting unit 80 afterward, the adhesion-preventing covering 90 and the collecting unit 80 may be integrated into a single unit.

In the latter case, a combination of the body of the adhesion-preventing covering 90 and the collecting unit 80 may first be formed from one specific synthetic resin, and an elastic member and a covering member may be provided afterward over relevant surfaces of the body of the adhesion-preventing covering 90.

While the above exemplary embodiment relates to a case where the adhesion-preventing covering 90 is provided on the collecting unit 80, the adhesion-preventing covering 90 does not necessarily need to be provided on the collecting unit 80. For example, if the collecting unit 80 is absent between the photoconductor unit 70 and the front covering, the adhesion-preventing covering 90 may be provided directly on the front covering. In such a case, the front covering serves as the preceding unit.

The element on which the adhesion-preventing covering 90 is provided is not limited to a unit that is attachable to and detachable from the apparatus body. The element may be any component configured to move before the detachable unit is attached to or detached from the apparatus body. If any member such as an internal covering that openably covers the front face of the detachable unit serves as the preceding unit, the member such as an internal covering may have the adhesion-preventing covering 90.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
- a detachable unit attachable to and detachable from an apparatus body;
- a preceding unit configured to move relative to the apparatus body before the detachable unit is attached to or detached from the apparatus body; and
- an adhesion-suppressing component provided on the preceding unit and configured to suppress adhesion of floating matter in the apparatus body to a grip of the detachable unit by slidably engaging an upper surface of the grip to contact the upper surface of grip before the preceding unit is moved relatively to the apparatus body.

2. The image forming apparatus according to claim 1, wherein the adhesion-suppressing component suppresses the adhesion of the floating matter to the grip of the detachable unit by coming into close contact with the grip when covering the grip.

3. The image forming apparatus according to claim 2, wherein the adhesion-suppressing component includes:
- a sliding member that exhibits high slidability and is to be in contact with the grip of the detachable unit; and
- an elastic layer located across the sliding member from the grip of the detachable unit and being capable of undergoing elastic deformation when the sliding member comes into contact with the grip of the detachable unit.

4. The image forming apparatus according to claim 1, wherein the grip of the detachable unit is positioned in such a manner as to face an opening provided in the apparatus body.

5. The image forming apparatus according to claim 4, wherein the detachable unit includes at least an image carrier configured to carry a toner image, and wherein the preceding unit includes a collecting device configured to collect waste toner discharged from the detachable unit.

6. An image forming apparatus comprising:
- a detachable unit attachable to and detachable from an apparatus body;
- a preceding unit configured to move relative to the apparatus body before the detachable unit is attached to or detached from the apparatus body; and
- means for suppressing adhesion of floating matter in the apparatus body to a grip of the detachable unit by slidably engaging an upper surface of the grip to contact the upper surface of grip before the preceding unit is moved relatively to the apparatus body, the means being provided on the preceding unit.

* * * * *